Figure 1:
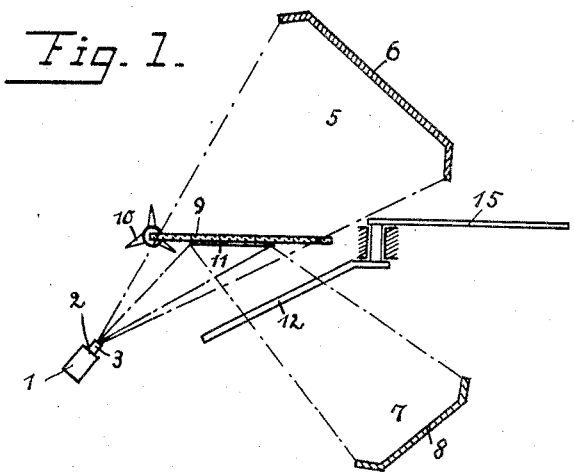

May 3, 1927.                                                      1,627,295
E. SCHÜFFTAN
METHOD AND APPARATUS FOR MAKING COMPOSITE MOTION PICTURES
Filed July 6, 1925          4 Sheets-Sheet 1

Witnesses
OMank.

Inventor
EUGEN SCHÜFFTAN
BY
ATTORNEYS

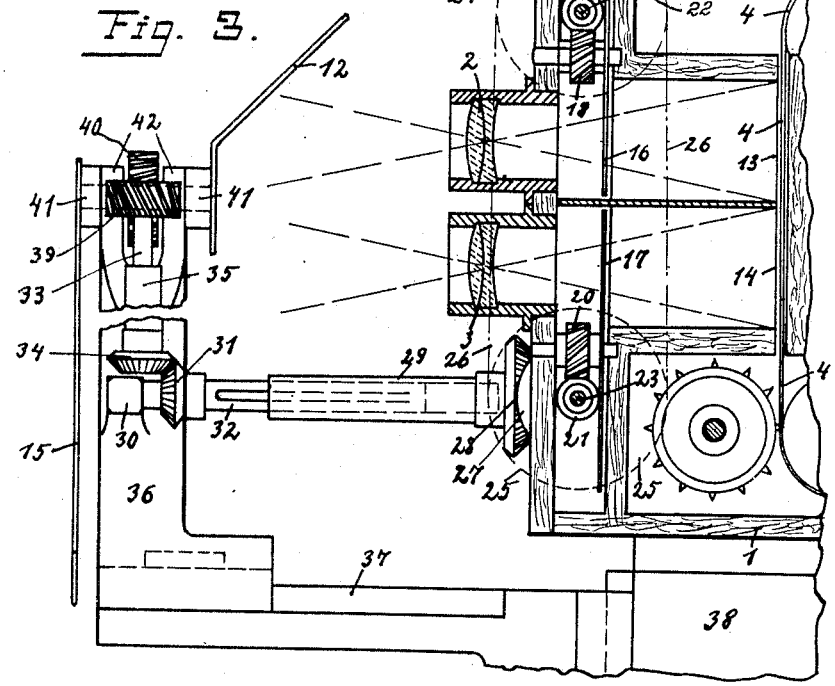

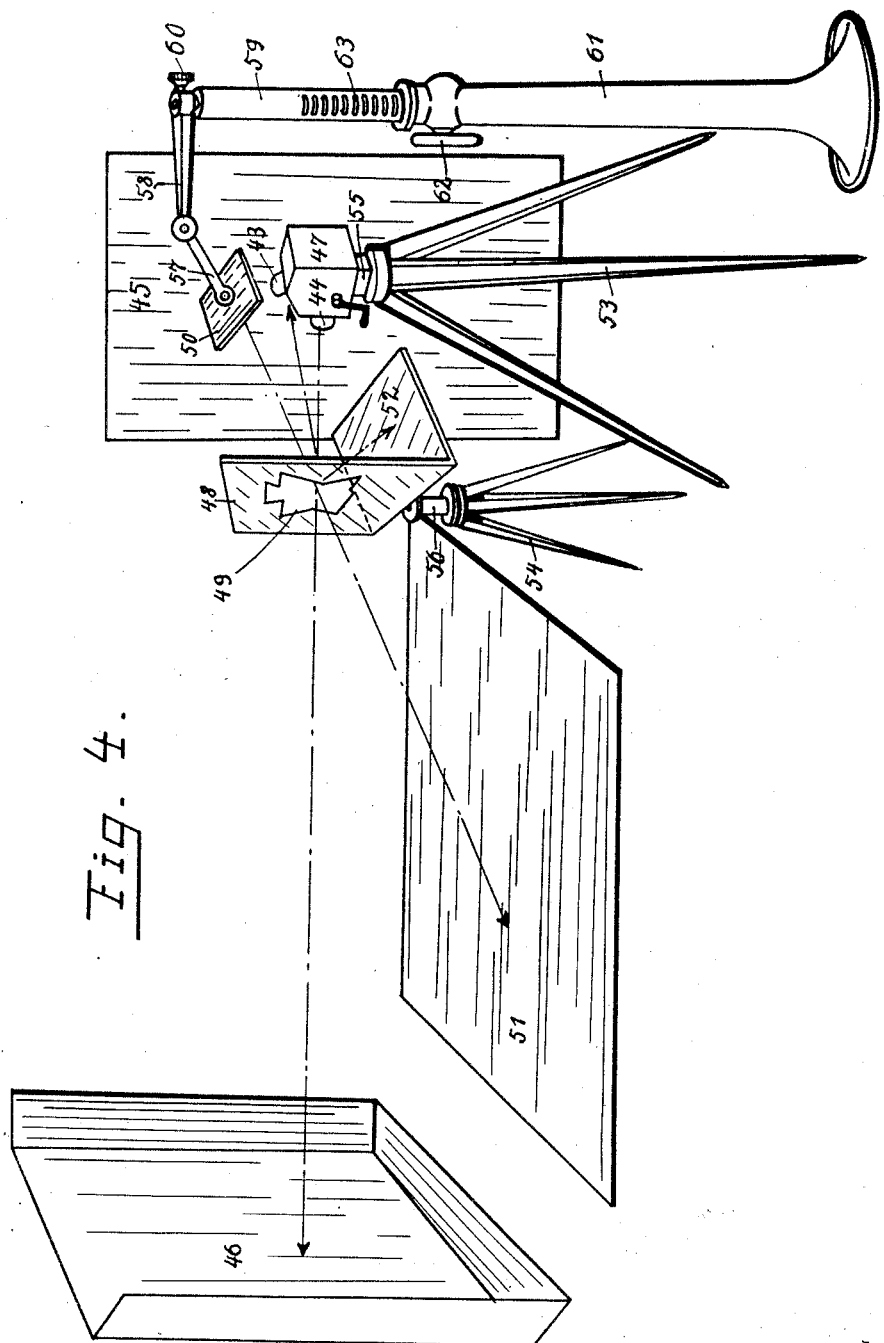

May 3, 1927.                                                      1,627,295
E. SCHÜFFTAN
METHOD AND APPARATUS FOR MAKING COMPOSITE MOTION PICTURES
Filed July 6, 1925          4 Sheets-Sheet 4

Witnesses

Inventor
EUGEN SCHÜFFTAN
BY
ATTORNEYS

Patented May 3, 1927.

1,627,295

UNITED STATES PATENT OFFICE.

EUGEN SCHÜFFTAN, OF BERLIN-WILMERSDORF, GERMANY.

METHOD AND APPARATUS FOR MAKING COMPOSITE MOTION PICTURES.

Application filed July 6, 1925, Serial No. 41,861, and in Germany April 29, 1924.

In cinematographic combination takings at which objects are to be taken at different distances from the taking apparatus it has been proposed to simultaneously take the pictures on a picture surface with objectives of different focuses, or to produce the takings in timely separation with differently adjusted objectives. In order to bring such takings to a pictural co-incidence it was necessary to interpose complementary masks between the object to be taken and the film.

It is the purpose of this present invention to avoid these masks, which purpose is obtained by using two objectives of different focus and a mirror or a mirror silhouette.

In the drawing illustrating several embodiments of the invention—

Figure 2:
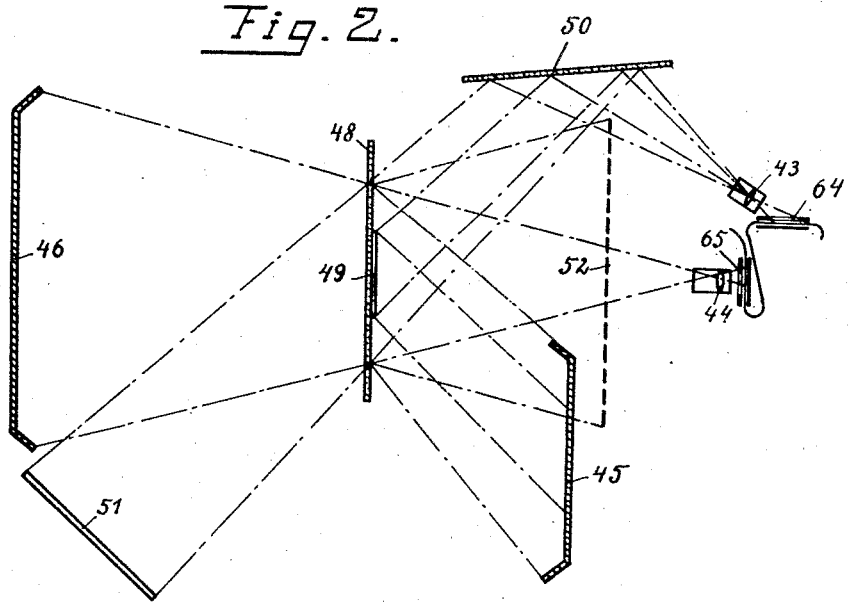
Figure 6:
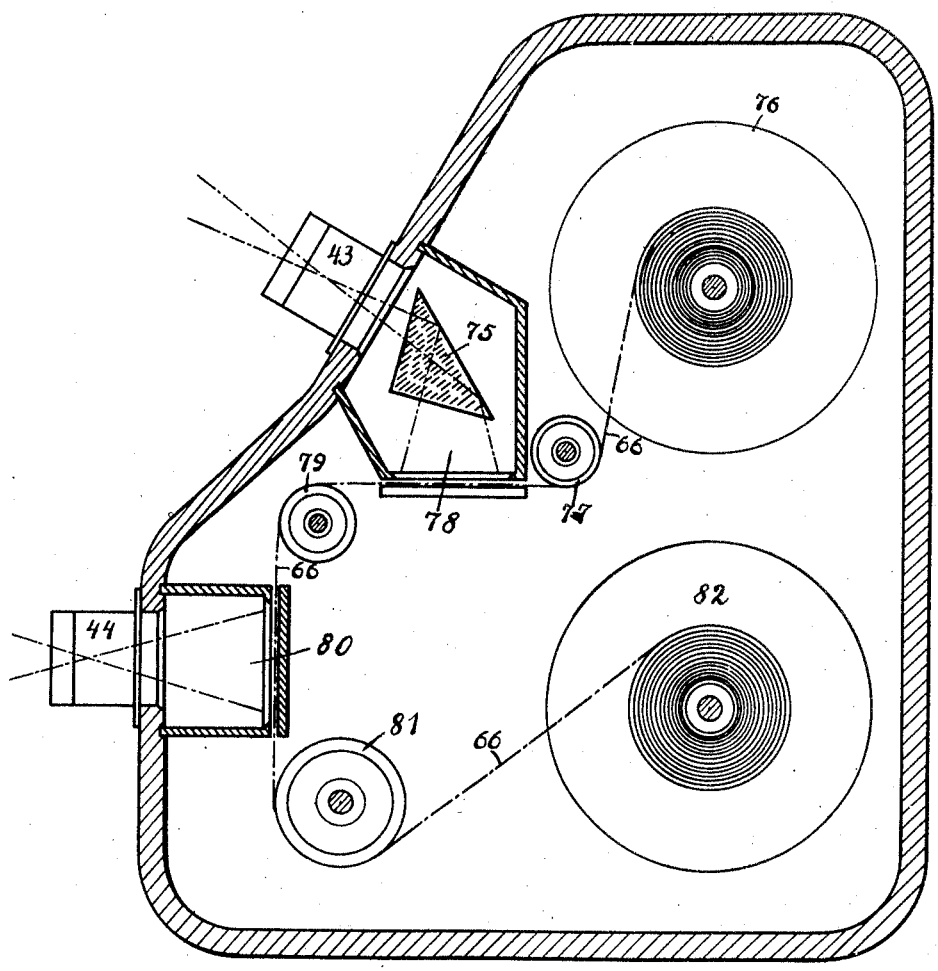

Fig. 1 is a diagram of the new taking system having two superimposedly arranged objectives, Fig. 2 illustrates a further embodiment having angularly arranged objectives, Fig. 3 is a part of a sectional view of a taking apparatus having two superimposed objectives, the masks being actuated before and behind the nonilluminated glass plate or mirror, Fig. 4 is a perspective view of the positioning of all the parts belonging to the embodiment according to Fig. 2, Fig. 5 is a section through an apparatus having two objectives arranged at an angle, Fig. 6 is a section of a modification of an apparatus according to Fig. 5.

According to Figs. 1 and 3 the apparatus 1 is provided with two superimposed objectives 2 and 3, the film 4 being successively passed behind the objectives 2 and 3. The picture of the object to be taken is successively taken in two phases on the same film tape by taking the object 6 positioned at 5 by means of objective 2, whereas the objective 3 is taking the object 8 positioned at 7. In order to bring the object 8 into pictural coincidence with the object 6 I interpose into the light cone of the object 6 a glass plate 9 which is carried by a standard 10 or is directly supported by the apparatus 1. The glass plate 9 is provided at its part corresponding to the mirage of object 8 with a mirror foil 11. During the standstill of the film tape the taking with objective 2 is performed and the object 6 taken through the glass plate 9. In order that in doing this the mirror foil be made ineffective I arrange a black mask or shutter 12 between the mirror 11 and the object 8, so that the mirror 11 reflects this black surface. Accordingly there will appear on the film tape 4 in the upper picture window 13 only a picture of the object 6 the part corresponding to the mirror remaining completely unexposed. After the taking the film is advanced one frame, so that now the exposed field of the film is within the picture window 14. Now a second mask 15 is moved behind the glass plate 9 into the light cone of object 6, so that the same becomes ineffective. The masks 12 and 15 are carried by a common axis 41 so that alternately the mask 12 can be moved into the light cone of 8 and the mask 15 into the light cone of 6. If the mask 15 is behind the glass plate 9 it is out of the range of the light cone of 8. Since the mask 15 is completely black the glass plate and the object 6 become photographically ineffective and the objective 3 can now take the object 8 by means of the mirror 11. Since the taking of the objects 6 and 8 is effected in short timed sequence the really existing time intervals or differences of the moved figures will but so little differ, that practical differences of the sequential taking cannot become effective.

The apparatus 1 must so be constructed that at a standstill of the film first the objective 2 and then the objective 3 is taking. In order that this may be obtained the shutters 12 and 15 must be run synchronously with the exposure shutters 16 and 17. These shutters 16 and 17 are provided with a known and therefore not illustrated window permitting the passage of the light rays to the picture windows 13 and 14 respectively if the masks 12 and 15 are swung out of the range of their respective light cones.

Preferably the shutters 16 and 17 are actuated by means of worm gears 18, 19 and 20, 21 respectively, the shafts 22 and 23 of the gears 19 and 21 being continuously actuated by sprockets 24 and 25 and a chain 26. The shaft 23 is further carrying a bevel gear 27 meshing with the bevel gear 28 of a shaft 29 which actuates a bevel gear 31 supported at 30 by means of the slide shaft 32 and this bevel gear 31 is meshing with a bevel gear 34 fixed on a shaft 33. This shaft 33 is carried in the bearing 35 of a standard 36 which is preferably adjustably supported by a shelf 37, arranged on the apparatus 1 or on the standard 38 thereof. The shaft 33 is carrying at its upper end a worm gear 39 meshing with a worm 40 on shaft 41 which is carried by bearings 42 and provided at its ends with the masks, 12 and 15. These masks are thus at any time actuated in synchronism with the apparatus 1. The worm gear 39 and worm 40 are similar in all respects with the arrangement of the worm gear 18 and the worm 19.

The arrangement according to Fig. 2 is schematically so illustrated that all of the parts are within one plane. In fact however the parts are so positioned as illustrated in Fig. 4 that Fig. 2 should be regarded with suitable reservation.

The two objectives 43, 44 are arranged at an angle. The two objects to be taken by the apparatus 47 (Figs. 2 and 4) are designated by the reference numerals 45 and 46. In the sight cone between the objective 44 and the object 46 a glass plate 48 is interposed which just as the plate 9 in Fig. 1 is at its part corresponding to the object 45 lined with a silhouette mirror foil 49. A mirror 50 is used for directing on the objective 43 the light rays issuing from the object 45 and reflected by the mirror foil 49. The total arrangement is so that the through-sight cones and the outgoing sight cones of the apparatus and of the mirror are diverging. A black mask 51 is, viewed from the mirror 50, arranged behind the glass plate 48 in order to avoid interference in the through-sight. A second mask 52 is connected with the plate 48 in order to avoid inconvenient affections of the picture of object 46.

Preferably the apparatus 47 (Fig. 4) is supported on a standard 53 and the glass plate 48 on a standard 54, known standard heads being arranged for the exact adjustment of the parts. The mirror 50 is adjustably carried by an arm 57 carried by an arm 58. Arm 58 is fixed to a vertically and circumferentially adjustable column 59 by means of set screws 60. The column 59 is carried by a standard 61 and can vertically be adjusted by the hand wheel 62 and rack gearing 63.

The objects 45 and 46 must be so adjusted relative to the mirrors 49 and 50, that there will be no distortion of the images as formed on the film in the camera, and furthermore provision must be made in the camera for correctly fitting the images since the images as formed in the cameras have their side edges reversely positioned. The cure for such a defect will be explained with reference to Figures 5 and 6. The taking can take place in one performance consecutively or concurrently on each film picture window or in timely complete separation.

By the use of the mirror 50 the side of the pictures are reversed; in order that this be counterbalanced the exposure of the film is effected alternately from the front and from the rear side.

In the embodiment according to Fig. 5 the apparatus 47 is carrying the two objectives 43 and 44 of which the objective 43 is working on the picture window 64 and the objective 44 on the picture window 65. The film 66 is coming from the spool 67 guided over a roller 68 and moved in a step by step way by the toothed roller 69, as this is well known in the art. The exposure of the film 66 within the picture window 64 is from the front side. From the roller 69 the film is passed over rollers 70, 71, and 72 to the picture window 65 and from here over the toothed feeding roller 73 to the spool 74. In the picture window 65 the film is exposed from the rear side. The rollers 69 and 73 are synchronously actuated.

The exposure of the film from the rear side can in view of the passage of the light rays through the film easily correct the reversed image positions of the scenes 45 and 46. Furthermore, the number of the frames which must pass over the various rollers between the exposures is so great that time differences up to a half a second can occur between the two exposures which has certain disadvantages. These disadvantages can only be done away with if on the one hand the exposure is made from one side only and on the other hand by limiting the space between the picture windows of the apparatus so that a limited number of frames of the film 66 will be moved between the windows as shown more particularly in Fig. 6 so that only a small fraction of a second will occur between locating the same frame before both windows.

According to Fig. 6 I interpose behind the objective 43 a prism 75 which deviates the light rays entering through the objective 43 and positions the picture produced in complete side concordance with the picture thrown by objective 44. The film 66 is now running far more simply, namely from the drum 76 to roller 77 through apparatus 78 to roller 79 and from here through camera and over roller 81 to the taking-up drum 82.

In the embodiments according to Figs. 1 and 2 the glass plates 9 and 48 with the mirror silhouette can be replaced by a semipermeable mirror, the silhouette being in this instance replaced by a black paper mask or the like, as this is per se well known in the art. The mirror silhouettes or the masks replacing them can be easily moved or modified in their shape during the taking operation.

What I claim is:—

1. An apparatus for taking composite motion pictures of a plurality of sets or scenes comprising a pair of objectives for respectively forming images of complementary portions of the sets or scenes, a transparent member having a portion of the surface thereof provided with an opaque reflecting surface and located between a set or scene and one of the objectives so that a portion of the last-mentioned set or scene may be imaged by the objective directly through the transparent member, the opaque reflecting surface masking the remaining portion of the set or scene, a mirror across the axis of the other objective and so disposed relative to the second objective, the opaque reflecting surface, and the other set or scene that light rays from the last-mentioned set or scene will be reflected successively by the opaque reflecting surface and the mirror along the axis of the second objective to provide a complementary image of the second set or scene, and means for moving the frames of a sensitive film in photogaphic relation with the images of the sets or scenes so that both the images of the sets or scenes will be registered in complementary relation on each frame of the film.

2. An apparatus for taking composite motion pictures of a plurality of sets or scenes comprising a pair of objectives for respectively forming images of complementary portions of the sets or scenes, a transparent member having a portion of the surface thereof provided with an opaque reflecting surface and located between a set or scene and one of the objectives so that a portion of the last-mentioned set or scene may be imaged by the objective directly through the transparent member, the opaque reflecting surface masking the portion of the set or scene, a mirror located at one side of the axis of the first-mentioned objective and across the axis of the second objective and so disposed relative to the second objective, the opaque reflecting surface and the other set or scene that light rays from the last-mentioned set or scene will be reflected successively by the opaque reflecting surface and the mirror along the axis of the second objective to provide a complementary image of the second set or scene, means for moving the frames of a sensitive film in photographic relation with the images of the sets or scenes so that both the images of the sets or scenes will be registered in complementary relation on each frame of the film, and means for causing reversal of the images of one of the sets or scenes when said images register on a frame.

3. An apparatus for taking composite motion pictures of complementary sets or scenes comprising a pair of objectives for respectively forming images of complementary portions of the sets or scenes, a transparent member having a portion of the surface thereof provided with an opaque reflecting surface and located between a set or scene and one of the objectives so that a portion of the last-mentioned set or scene may be imaged by the objective directly through the transparent member, the opaque reflecting surface masking the remaining portion of the set or scene, a mirror across the axis of the other objective and so disposed relative to the second objective, the opaque reflecting surface and a second set or scene which is complementary to the first set or scene that light rays from the last-mentioned set or scene will be reflected successively by the opaque reflecting surface and the mirror along the axis of the second objective to provide a complementary image of the second set or scene, means for moving the frames of a sensitive film in photographic relation with the images of the sets or scenes so that both the images of the sets or scenes will be registered in complementary relation on each frame of the film, masks located in alignment with the mirror and opaque reflecting surface to prevent the reflection of light rays which are extraneous to the sets or scenes.

4. An apparatus for taking composite motion pictures of a plurality of sets or scenes comprising a pair of objectives for respectively forming images of complementary portions of the sets or scenes, a transparent member, a mask including a reflecting surface located between a set or scene and one of the objectives so that a portion of the image of said set or scene will be formed by the objective, a mirror located across the axis of the second objective and to one side of the axis of the first-mentioned objective and so disposed relative to the second objective, the reflecting surface and a second set or scene that light rays from the last-mentioned set or scene will be reflected successively by the reflecting surface and the mirror along the axis of the second objective to provide a complementary image of the second set or scene, means for moving the frames of the sensitive film in photographic relation with the images of the sets or scenes so that both the images of the sets or scenes will be registered in complementary relation on each frame of the film.

5. An apparatus for taking composite motion pictures of a plurality of sets or scenes comprising a pair of objectives for respectively forming images of complementary portions of the sets or scenes, a transparent member, a mask including a reflecting surface located between a set or scene and one of the objectives so that a portion of the image of said set or scene will be formed by the objective, a mirror located across the axis of the second objective and to one side of the axis of the first-mentioned objective and so disposed relative to the second objective, the reflecting surface and a second set or scene that light rays from the last-mentioned set or scene will be reflected successively by the reflecting surface and the mirror along the axis of the second objective to provide a complementary image of the second set or scene, means for moving the frames of the sensitive film in photographic relation with the images of the sets or scenes so that both the images of the sets or scenes will be registered in complementary relation on each frame of the film, and means for causing a reversal of the image of one of the sets or scenes when registered on a frame.

6. The art of making composite motion pictures of a plurality of sets or scenes which comprises arranging a light transmitting member partly covered with an opaque reflecting surface between a set or scene and an objective, forming an image of a portion of said set or scene on a frame of a sensitive film directly through the light-transmitting member, arranging a mirror across the axis of a second objective and at an angle to the reflecting surface on the transparent member, arranging a second set or scene in reflective relation with the opaque reflecting surface so that light rays from the second set or scene will be reflected successively by the opaque reflecting surface and the mirror along the axis of the second objective, forming an image of a portion of the second set or scene on the same frame of the film, the last-mentioned image being complementary to the first-mentioned image.

7. The art of making composite motion pictures of a plurality of sets or scenes which comprises arranging an opaque reflecting surface between a set or scene and an objective while masking a portion of said set or scene, forming an image of the unmasked portion of said set or scene on a frame of a sensitive film, arranging a second set or scene and a mirror at angles to the opaque reflecting surface with the mirror across the axis of a second objective, forming an image of the second set or scene by reflecting the light rays of the second set or scene from the opaque reflecting surface to the mirror and reflecting the light rays from the mirror along the axis of the second objective, registering the reflected light rays of the second-mentioned scene on the same frame in complementary relation to the image formed of the first-mentioned set or scene.

8. The art of making composite motion pictures of a plurality of pictorial complementary sets or scenes which comprises interposing between an objective and a set or scene a transparent member having a silhouetted mirror foil adapted to reflect the light rays of a second set or scene to one side of the axis of the objective, arranging a second set or scene opposite the silhouetted mirror foil while reflecting the light rays of the second set or scene to one side of the axis of the objective, arranging a mirror across the axis of a second objective and in the path of the reflected light rays of the second set or scene, forming an image of the second set or scene complementary to the image of the first-mentioned set or scene, then feeding the frames of sensitive film in photographic relation with the images formed by the first and second-mentioned objectives.

9. The method of making composite motion pictures of a plurality of pictorial complementary sets or scenes which comprises interposing between an objective and a set or scene a transparent member having a silhouetted mirror foil adapted to reflect the light rays from a second set or scene, forming an image of the first-mentioned set or scene of such a contour as will be shaped by the mirror foil, registering the image of the first-mentioned set or scene on a frame of a sensitive film, thereby leaving an unexposed portion of the frame which corresponds to that of the silhouetted foil, arranging the second set or scene and a mirror upon opposite sides of the silhouetted foil with the mirror being arranged across the axis of a second objective and feeding the frames of the film in photographic relation with the second objective while reversing one of the images so that the image of the second set or scene will be registered in complementary relation with the image of the first-mentioned set or scene.

In testimony whereof I have affixed my signature.

EUGEN SCHÜFFTAN.